(12) United States Patent
McComas et al.

(10) Patent No.: US 9,228,895 B2
(45) Date of Patent: Jan. 5, 2016

(54) IMAGING SYSTEM WITH MULTIPLE FOCAL PLANE ARRAY SENSORS

(75) Inventors: Brian K. McComas, Tucson, AZ (US); Kent P. Pfibsen, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 174 days.

(21) Appl. No.: 13/480,676

(22) Filed: May 25, 2012

(65) Prior Publication Data
US 2013/0314567 A1    Nov. 28, 2013

(51) Int. Cl.
| H04N 1/028 | (2006.01) |
|---|---|
| H04N 5/225 | (2006.01) |
| H04N 9/09 | (2006.01) |
| G01J 3/02 | (2006.01) |
| G01J 3/36 | (2006.01) |
| G02B 17/06 | (2006.01) |
| G01J 3/28 | (2006.01) |

(52) U.S. Cl.
CPC ............ *G01J 3/0291* (2013.01); *G01J 3/021* (2013.01); *G01J 3/0237* (2013.01); *G01J 3/0286* (2013.01); *G01J 3/2823* (2013.01); *G01J 3/36* (2013.01); *G02B 17/0652* (2013.01); *H04N 1/0281* (2013.01); *H04N 5/2258* (2013.01); *H04N 5/2259* (2013.01); *H04N 9/09* (2013.01)

(58) Field of Classification Search
None
See application file for complete search history.

(56) References Cited

U.S. PATENT DOCUMENTS

| 5,009,494 | A | * | 4/1991 | Iossi et al. ..................... 359/366 |
|---|---|---|---|---|
| 5,206,499 | A |   | 4/1993 | Mantravadi et al. |
| 5,801,373 | A | * | 9/1998 | Oozu et al. ................. 250/208.1 |
| 6,020,994 | A |   | 2/2000 | Cook |
| 6,192,322 | B1 | * | 2/2001 | Rafanelli et al. .............. 702/150 |
| 6,366,734 | B1 | * | 4/2002 | Beran et al. ....................... 396/8 |
| 6,426,776 | B1 | * | 7/2002 | Ochi ............................. 348/370 |
| 6,512,539 | B1 | * | 1/2003 | Dance et al. .................. 348/203 |
| 6,969,840 | B1 | * | 11/2005 | Theriault et al. .............. 250/216 |
| 2005/0180026 | A1 |   | 8/2005 | Pohle |
| 2010/0123951 | A1 | * | 5/2010 | Shaw et al. .................... 359/399 |
| 2011/0085235 | A1 | * | 4/2011 | Cook ............................ 359/366 |
| 2011/0114078 | A1 | * | 5/2011 | Fargo ............................ 126/573 |
| 2011/0176205 | A1 | * | 7/2011 | Shaw et al. .................... 359/365 |
| 2011/0226955 | A1 | * | 9/2011 | Luty et al. ..................... 250/353 |
| 2012/0081511 | A1 | * | 4/2012 | Kasunic et al. ................. 348/36 |
| 2013/0070091 | A1 | * | 3/2013 | Mojaver ........................ 348/143 |

FOREIGN PATENT DOCUMENTS

EP    2214405 A2    8/2010

* cited by examiner

*Primary Examiner* — Roberto Velez
*Assistant Examiner* — Quan Pham
(74) *Attorney, Agent, or Firm* — Lando & Anastasi, LLP

(57) ABSTRACT

A multi-wavelength optical imaging system and method. In one example, an optical imaging system includes an integrated dewar assembly housing a staring detector that includes a plurality of focal plane array sensors spatially distributed over a common focal plane and aligned relative to one another, each of the plurality of focal plane array sensors being configured for a different waveband. The optical imaging system further includes foreoptics, such as a telescope, optically coupled to the integrated dewar assembly and configured to direct and focus light from an entrance pupil of the optical imaging system into an optical beam incident on at least one of the plurality of focal plane array sensors.

11 Claims, 2 Drawing Sheets

IMAGING SYSTEM WITH MULTIPLE FOCAL PLANE ARRAY SENSORS

BACKGROUND

Various applications use multi-wavelength sensors. Currently there are two solutions generally employed for multiple wavelength staring sensors, namely the use of single multi-wavelength focal plane array sensors, or the use of multiple co-aligned single wavelength focal plane array sensors.

Using multiple separate co-aligned single wavelength focal plane array sensors entails independently aligning the individual sensors with high precision, typically using a beamsplitter and alignment targets. As a result, this approach generally uses highly sophisticated mounting systems which will accommodate alignment correction while holding the focal plane array sensors accurately in their relative positions during operation of the system and over the operating temperature range. A further complication with this approach is that the sensors are generally aligned at ambient temperature; however, they will often be cryogenically cooled during operation, which can lead to alignment errors. Using multi-wavelength focal plane array sensors simplifies the alignment of the wavelength bands since the alignment is done during manufacturing of the sensor array itself. For example, the different wavelength detectors may be grown on top of each other on a semiconductor wafer. However, this process increases the cost of the sensor and risk of defects that result from the additional processing and handling steps during manufacture, and reduces the array's performance. For example, defective pixels in one wavelength band are typically correlated with defective pixels in another wavelength band since the band-detectors are grown on top of one another.

SUMMARY OF INVENTION

Aspects and embodiments are directed to a multi-wavelength staring, or two-dimensional, imaging system using multiple focal plane array sensors that may address or overcome several of the disadvantages associated with conventional multi-wavelength systems. Various embodiments leverage the availability of wide field-of-view telescopes, integrated dewar systems and high capacity cryogenic systems, and image fusion processes to provide a robust, versatile multi-wavelength imaging system, as discussed in more detail below.

According to one embodiment, an optical imaging system comprises an integrated dewar assembly including a detector sub-system, the detector sub-system including a plurality of focal plane array sensors spatially distributed over a common focal plane and aligned relative to one another, each of the plurality of focal plane array sensors being configured for a different waveband, and foreoptics optically coupled to the integrated dewar assembly and configured to direct and focus light from an entrance pupil of the optical imaging system into an optical beam incident on at least one of the plurality of focal plane array sensors.

In one example, the plurality of focal plane array sensors includes a plurality of a single-color focal plane array sensors. The plurality of single-color focal plane array sensors may be mounted side-by-side on a common substrate to provide a two-dimensional multi-waveband staring detector. In one example, each single-color focal plane array sensor is configured to produce a two-dimensional image signal in a different waveband, and further comprising an image processor coupled to the plurality of single-color focal plane array sensors and configured to spatially combine the two-dimensional image signals from the plurality of single-color focal plane array sensors to produce a multi-wavelength image. In another example, the plurality of single-color focal plane array sensors includes a first single-color focal plane array sensor configured for a first waveband and a second single-color focal plane array sensor configured for a second waveband, wherein the foreoptics includes a movable optical element, and the optical imaging system further comprises a tilt mechanism coupled to the movable optical element and configured to move the movable optical element over a range of angular motion so as to scan the optical beam sequentially across the first single-color focal plane array sensor and the second single-color focal plane array sensor. The optical imaging system may further comprise a housing, the foreoptics and the integrated dewar assembly being containing within the housing. In one example, the integrated dewar assembly is a cryogenic integrated dewar assembly configured to cool the detector sub-system to cryogenic temperatures during operation of the optical imaging system.

In another example, the foreoptics comprises a wide field-of-view telescope including a plurality of optically coupled mirrors, one of the plurality of optically coupled mirrors being the movable optical element. The plurality of optically coupled mirrors may include a primary mirror configured to receive the light from the entrance pupil of the optical imaging system and to reflect the light, a secondary mirror configured to receive the light reflected from the primary mirror and to further reflect the light, a tertiary mirror configured to receive the light reflected from the secondary mirror and to further reflect the light, and a quaternary mirror configured to receive the light reflected from the tertiary mirror and to reflect and focus the light to provide the optical beam and to direct the optical beam to the detector sub-system. In one example, the tertiary mirror is the movable optical element, and the tilt mechanism is coupled to the tertiary mirror.

Another embodiment is directed to an imaging method comprising focusing incoming light from a scene with foreoptics to provide an optical beam, receiving the optical beam at a staring detector, the staring detector including a plurality of single-color focal plane array sensors spatially distributed over a common focal plane and aligned relative to one another, producing from the plurality of single-color focal plane array sensors a corresponding plurality of staring image signals, each single-color focal plane array sensor producing the corresponding staring image signal in a different waveband, and combining the plurality of staring image signals to provide a multi-wavelength image of the scene.

The imaging method may further comprise analyzing the multi-wavelength image, detecting an object of interest in the multi-wavelength image, and sequentially directing a field-of-view of each of the plurality of single-color focal plane array sensors toward the object of interest. The imaging method may further comprise sweeping the optical beam over the staring detector to obtain over time, from the plurality of single-color focal plane array sensors, a plurality of second image signals corresponding to a common region of the scene. In one example, combining the plurality of staring image signals includes combining the plurality of second image signals to produce a second multi-wavelength image of the common region of the scene. In another example, sweeping the optical beam includes tilting an optical element of the foreoptics to sweep the optical beam over the staring detector. In another example, sweeping the optical beam over the staring detector further includes obtaining over time from each single-color focal plane array sensor a plurality of staring single-color image signals of adjacent regions of the scene, and for each single-color focal plane array sensor, combining the plurality of staring single-color image signals to produce a single-color image of the scene. The imaging method may further comprise combining the staring single-color images of the scene from each single-color focal plane array sensor to produce a multi-color image of the scene. The imaging method may further comprise cryogenically cooling the staring detector.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to a multi-wavelength imaging system that leverages features and techniques associated with high quality single-color focal plane array sensors, wide field-of-view telescopes, and multi-image processing. Some telescopes incorporate a large format integrated dewar assembly that houses a detector. For example, a large format dewar assembly may include a focal plane array sensor that is about 512 by 512 pixels in size, corresponding to a physical size of about 15 millimeters (mm) by 15 mm across. Cooling these large format arrays may be substantially more difficult than cooling more conventional smaller arrays, which may have a physical size of about 7.5 mm by 7.5 mm. In one example, a wide field-of-view telescope may have a field-of-view of about 2 degrees or higher. According to certain aspects and embodiments, a multi-wavelength optical imaging system includes a plurality of single waveband (also referred to as "single-color") focal plane array sensors spatially distributed over a large format integrated dewar assembly and optically coupled to a wide field-of-view telescope. Image fusion processing may be used to integrate multiple waveband imagery from the different focal plane array sensors and create multi-wavelength images of a scene, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
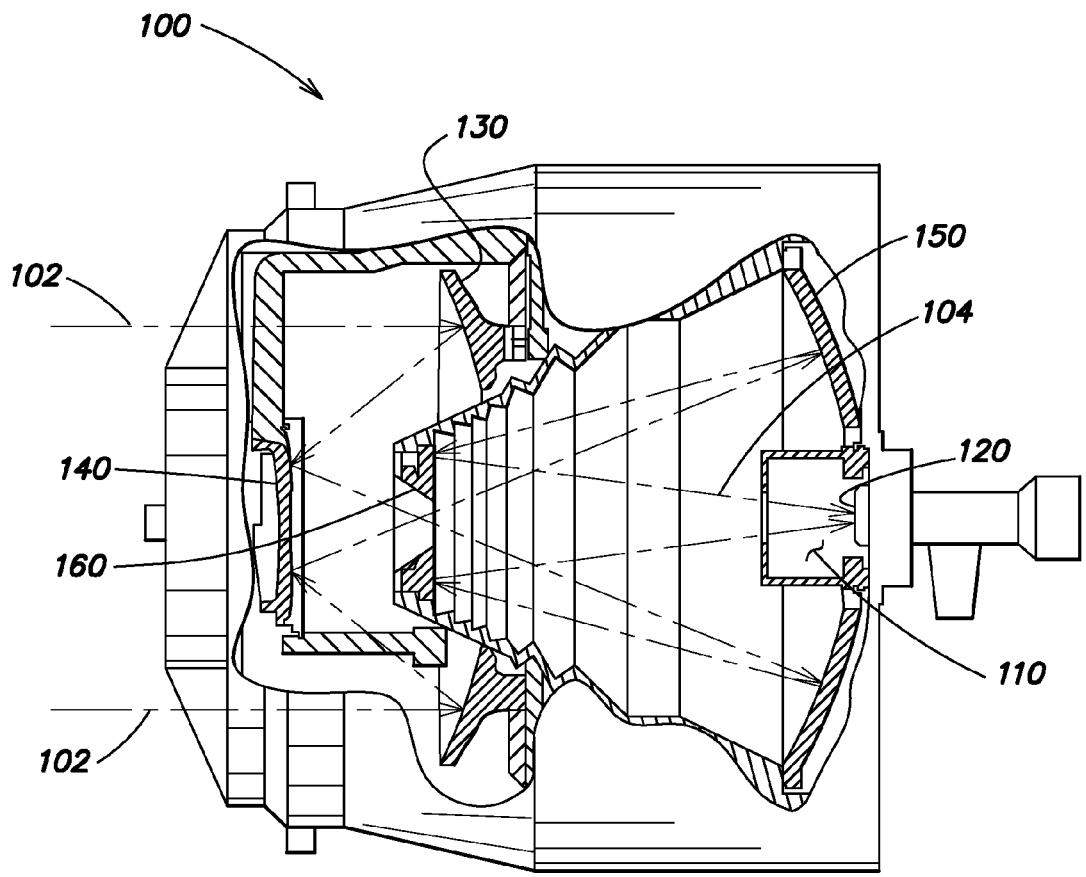
FIG. 1 is a diagram illustrating one example of a multi-wavelength optical imaging system according to aspects of the invention.

Referring to FIG. 1, there is illustrated one example of an optical system including a wide field-of-view telescope 100 that includes a plurality of mirrors and a large format integrated dewar assembly 110. In some examples, the integrated dewar assembly 110 may be cryogenically cooled during operation of the optical imaging system. The dewar assembly 110 houses a staring detector 120 that includes multiple spatially distributed single-color focal plane array sensors, as discussed further below. As used herein, the term staring detector refers to a two dimensional imaging systems, similar to a CCD camera, for example. Staring sensors or detectors are capable of staring at a location and obtaining a recognizable two-dimensional image of the scene. In contrast, a different class of sensors known as line scanning sensors, scan the scene across the focal plane. These line scanning sensors obtain an image by taking a small strip (one dimensional) at a time. Accordingly, line scanning sensors require the optical system to move in order to get a recognizable image, whereas, as discussed above, a staring sensor may obtain a recognizable image without moving the optical system.

In one embodiment, the telescope 100 includes an arrangement of four optically coupled mirrors that direct incoming light rays 102 into the dewar assembly 110 and onto the staring detector 120. In the illustrated example, incoming light rays 102 are reflected by a primary mirror 130, which directs the light rays 102 to a secondary mirror 140. The light rays are reflected by the secondary mirror and directed to a tertiary mirror 150. The light rays 102 are again reflected by the tertiary mirror 150 onto a quaternary mirror 160 that focuses and reflects the light rays into the dewar assembly 110, as shown. Thus, the telescope 100 receives light rays 102 from a distant scene incident on the primary mirror 130, and reimages and collimates the light rays to direct an optical beam 104 onto the detector 120.

The optical arrangement of the telescope 100 may take numerous forms, as would be understood and appreciated by those skilled in the art, given the benefit of this disclosure. In one example, the primary mirror 130 is a positive powered parabolic mirror that receives the light rays 102 from an external source parallel to a beam-axis of the telescope 100. The secondary mirror 140 may be a smaller mirror having an aspheric form, and may be configured to compensate for aberrations in the primary mirror 130. The tertiary mirror 150 may be a positive powered ellipsoidal mirror, for example. The quaternary mirror 160 may be a smaller, near-flat mirror configured to focus the light rays 102 from the tertiary mirror 150 and direct the converging optical beam to the detector 120, as discussed above. In addition, in one embodiment, the optical system includes a movable optical element which allows the optical beam 104 to be scanned across the detector 120, as discussed further below.

Figure 2:
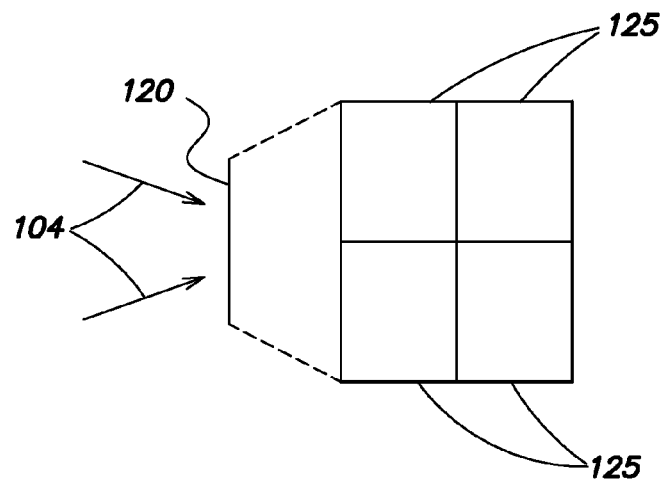
FIG. 2 is a schematic block diagram of one example of an imaging detector according to aspects of the invention.

Referring to FIG. 2, in one embodiment, the staring detector 120 includes multiple single-color focal plane array sensors 125 that are co-aligned and arranged side-by-side on a common focal plane. As used herein, the terms "single-color" sensor or "single-waveband" sensor are intended to refer to a relatively narrow-band sensor that is configured to optimally detect a particular spectral waveband. For example, a "red" focal plane array sensor may be configured to primarily or optimally detect red light (or the red spectral waveband) including the wavelength range of approximately 630-740 nanometers (nm). Similarly, a "blue" focal plane array sensor may be configured to primarily or optimally detect blue light (or the red spectral waveband) including the wavelength range of approximately 450-475 nm. The detector 120 may include a plurality of different single-color focal plane array sensors 125, each configured for a particular waveband. The plurality of single-color focal plane array sensors 125 may includes sensors configured for various different wavebands, including wavebands in the visible, infrared, and/or ultraviolet regions of the spectrum.

In one embodiment, the plurality of single-color focal plane array sensors are spatially distributed across a common focal plane, such as a common substrate, for example, that is incorporated within the large format integrated dewar assembly 110. Referring again to FIG. 2, in the illustrated example, four different single-color focal plane array sensors are arranged side-by-side to form a two-dimensional multi-wavelength staring detector 120. The plurality of single-color focal plane array sensors 125 may be spatially separated from one another, but aligned relative to one another. It is to be appreciated that the detector 120 may include any number of single-color focal plane array sensors 125, not limited to four, and may include one or more than one focal plane array sensor configured for any given waveband. The plurality of single-color focal plane array sensors 125 may be co-aligned using any of numerous alignment techniques. In one example, the plurality of single-color focal plane array sensors 125 are co-aligned using photolithographic techniques or precision optical alignment techniques, for example. Co-alignment of the plurality of single-color focal plane array sensors 125 may be performed during manufacture of the detector 120, and the sensors may be fixed in place on a common substrate during the manufacturing process. As a result, no misalignment may occur during movement of the optical system, or due to thermal expansion/contraction during operation at cryogenic temperatures, thus avoiding misalignment errors that may occur with conventional multi-sensor systems as discussed above.

According to one embodiment, placing multiple single-color focal plane array sensors in the common integrated dewar assembly 110 may reduce sensor cost and risk, and provide a relatively low cost, high performance multi-wavelength optical imaging system. In one example, each single-color focal plane array sensor 125 may be tested for defects and performance prior to be being mounted in the dewar assembly 110. Unlike conventional multi-sensor assemblies in which the sensors for different wavebands are grown on top of each other on a semiconductor wafer, according to various embodiments the different sensors are spatially separated and therefore "bad" pixels in one waveband are not spatially correlated with other wavebands. In one example, absolute alignment (alignment along the optical axis or line-of-sight of the telescope) of the individual ones of the plurality of single-color focal plane array sensors 125 may not be necessary since the relative alignment of the sensors may be measured during manufacture of the detector 120 or installation in the dewar assembly 110. Relative alignment measurements may be used to map pixel-to-pixel positions of the individual focal plane array sensors 125 within the detector 120. Absolute alignment of the detector 120 as a whole is routine and easily accomplished during testing or calibration of the optical system. In addition, providing multiple single-color focal plane array sensors 125 may allow for greater system waveband flexibility, since the system may be configured with any of numerous different single-color focal plane array sensors.

According to one embodiment, the plurality of single-color focal plane array sensors 125 may be used together or individually to image a scene. Since the plurality of single-color focal plane array sensors 125 are spatially distributed across the detector substrate, each sensor projects into object space (through the telescope optics) at a slightly different angle. In addition, since the different sensors 125 may be optimized or configured for different wavebands, each sensor may have a slightly different field of view of the scene. As discussed above, the plurality of single-color focal plane array sensors 125 may be co-aligned and their positions relative to one another and to the optical axis of the system may be known. Therefore, each sensor 125 may project into object space at a known orientation. Accordingly, the images from all, or from a selected group of, the individual sensors 125 may be combined using image processing techniques to generate a multi-wavelength image of the scene.

Figure 3:
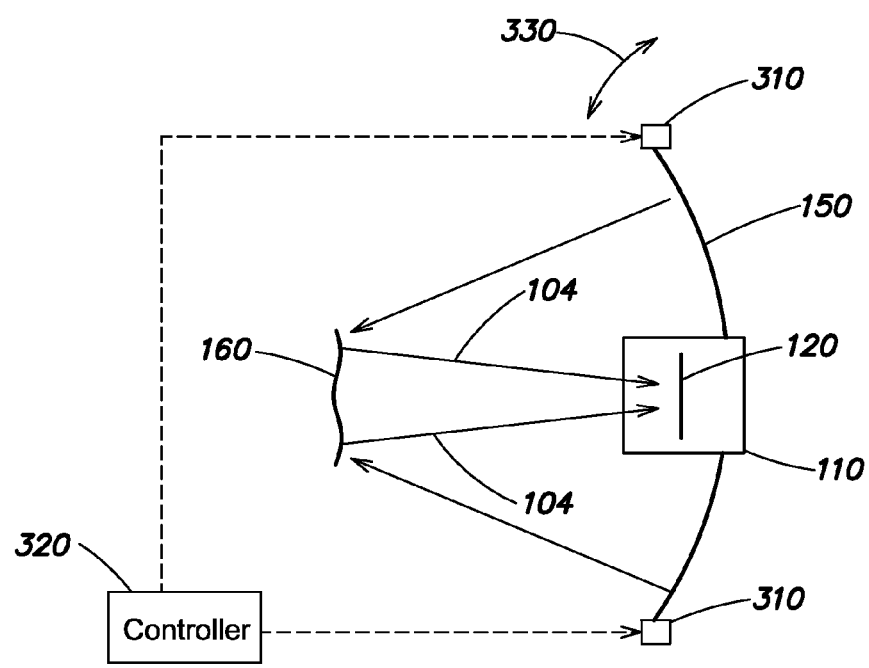
FIG. 3 is a schematic diagram of a portion of a multi-wavelength optical imaging system according to aspects of the invention.

In one example, the tertiary mirror 150 may be moved to sweep the optical beam 104 across the detector 120, thereby allowing different ones of the plurality of single-color focal plane array sensors 125 to image the same portion of the scene. For example, referring to FIG. 3, a tilt mechanism 310 may be coupled to the tertiary mirror 150 and actuated, for example, under the control of a controller 320, to move the tertiary mirror over a range of angular motion 330 that corresponds to a desired sweep of the optical beam 104 over the detector 120. Accordingly, the field-of-view of each sensor 125 may be rapidly slewed across the object space (field of regard) of the telescope 100 by moving the tertiary mirror 150. In one example, image stabilization techniques, as may be used in camera lens systems, may be used to "dither" the tertiary mirror, thereby moving the optical beam 104 over the detector 120 and consequently from one single-color focal plane array sensor 125 to another. This allows each single-color focal plane array sensor 125 to image the same portion of the scene in rapid succession. Thus images of the scene at multiple different wavebands (from the different single-color focal plane array sensors 125) may be obtained. The ability to image the same region at multiple different wavebands may provide enhanced ability to detect and discriminate objects of interest in the scene.

In one example, the tilt mechanism 310 is coupled to or part of a jitter sensing and control mechanism on the line-of-sight of the telescope 100. Thus, the tilt mechanism 310 may be used to remove jitter from the optical beam 104 by moving the tertiary mirror to direct the optical beam to compensate for jitter. Compensating for line-of-sight jitter may allow for faster image acquisition and processing times and/or increase image acquisition range due to there being less noise on the optical signals. Although the above examples discuss the tilt mechanism being coupled to the tertiary mirror 150 and configured to move the tertiary mirror, in other embodiments the tilt mechanism may be coupled to and control the position of another optical element of the telescope 100 (e.g., the quaternary mirror 160) which allows the field-of-view of each sensor 125 to be moved across the object space. In addition, the telescope 100 may be mounted on a mobile platform, for example, a vehicle or gimbal on a vehicle or stationary platform, such that movement of the platform moves the line-of-sight of telescope and therefore the field-of-view of each sensor 125.

Given a known relative alignment of the plurality of single-color focal plane array sensors 125, the images from each sensor may be combined using image-fusion techniques known to those skilled in the art to create a composite multi-wavelength image of the scene. Thus, an optical imaging system including the telescope 100 may further include an image processor or other controller coupled to the detector 120 and configured to receive image signals from the plurality of single-color focal plane array sensors 125 and to process the signals to generate images of the scene. In one example, images from each sensor 125 in the array at a given point in time may be spatially combined to create an overall multi-wavelength image of scene, with different regions in the image corresponding to the different wavebands of the plurality of single-color focal plane array sensors 125. The ability to spatially combine the images from multiple individual single-color focal plane array sensors 125 allows for wide field-of-view high resolution imaging. In one example, by spatially combining the sensor images, the system may collect a larger field-of-regard image (compared to spatially overlapped sensors) simultaneously with multiple waveband field-of-view imagery. In one example, a multi-wavelength composite image of the scene may be initially obtained, then analyzed, and if an object of interest is located within the composite image, the field-of-view of multiple single-color focal plane array sensors may be sequentially scanned over the region of the scene that contains the object of interest to obtain more detailed imagery of the object.

In another example, images gathered by a single single-color focal plane array sensor 125 over time, as the field-of-view of the sensor is swept across the scene may be combined to generate a single-color image of the scene, in a manner similar to the process of creating a panoramic photograph. This process may be repeated for multiple single-color focal plane array sensors 125 to generate multiple single-color images of the scene. These single-color images may be combined to produce a multi-wavelength image of the scene. The different sensors 125 may provide images of the scene at different wavelengths; however, the waveband of each sensor may be selected to provide useful information about the scene. Thus, multiple waveband images obtained from the various single-color focal plane array sensors 125 may be used individually and/or in combination to obtain information about the scene or objects identified therein.

Thus, aspects and embodiments are directed to imaging systems and methods that utilize a plurality of single-color focal plane array sensors spatially distributed across a large format integrated dewar assembly, together with image fusion processes to integrate the multiple waveband imagery. As discussed above, certain embodiments further include a tilt mechanism to control the position of an optical element which allows the field-of-view of each single-color focal plane array sensor to be scanned across the field of regard of the imaging system, providing for multi-wavelength imaging of the same region of the field of regard. Systems and methods according to various embodiments may be used in a variety of applications including, for example, target acquisition and tracking, and machine vision applications, such as product inspection. For example, embodiments may be used in machine vision applications where parts under inspection are moving beneath an optical imaging system. As a part moves under the detector 120, the part is imaged on one single-color focal plane array sensor and then another, allowing for pseudo-color high resolution imagery of high speed moving parts. This imagery may be used to identify and reject defective parts, for example.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical imaging system comprising:
   an integrated dewar assembly including a two-dimensional multi-waveband staring detector including a plurality of single-color focal plane array sensors spatially distributed over a common focal plane and co-aligned side-by-side relative to one another, each of the plurality of single-color focal plane array sensors being configured to produce a two-dimensional staring image signal in a different waveband, the plurality of single-color focal plane array sensors including a first single-color focal plane array sensor configured for a first waveband and a second single-color focal plane array sensor configured for a second waveband;
   foreoptics coupled to the integrated dewar assembly and configured to direct and focus light from an entrance pupil of the optical imaging system into an optical beam incident on at least one of the plurality of single-color focal plane array sensors, wherein the foreoptics comprises a wide field-of-view telescope including at least four mirrors, one of the at least four mirrors being a movable optical element;
   a tilt mechanism coupled to the movable optical element and configured to move the movable optical element over a range of angular motion so as to sequentially direct the optical beam onto the first single-color focal plane array sensor and then onto the second single-color focal plane array sensor; and
   an image processor coupled to the two-dimensional multi-waveband staring detector and configured to spatially combine the two-dimensional staring image signals from the first and second single-color focal plane array sensors to produce a multi-wavelength image.

2. The optical imaging system of claim 1, wherein the plurality of single-color focal plane array sensors are mounted side-by-side on a common substrate to provide the two-dimensional multi-waveband staring detector.

3. The optical imaging system of claim 1, wherein the at least four mirrors include:
   a primary mirror configured to receive the light from the entrance pupil of the optical imaging system and to reflect the light;

a secondary mirror configured to receive the light reflected from the primary mirror and to further reflect the light;

a tertiary mirror configured to receive the light reflected from the secondary mirror and to further reflect the light, wherein the tertiary mirror is the movable optical element, and the tilt mechanism is coupled to the tertiary mirror; and a quaternary mirror configured to receive the light reflected from the tertiary mirror and to reflect and focus the light to provide the optical beam and to direct the optical beam to the two-dimensional multi-waveband staring detector.

4. The optical imaging system of claim 1, further comprising a housing, the foreoptics and the integrated dewar assembly being contained within the housing.

5. The optical imaging system of claim 4, wherein the integrated dewar assembly is a cryogenic integrated dewar assembly configured to cool the two-dimensional multi-waveband staring detector to cryogenic temperatures during operation of the optical imaging system.

6. An imaging method comprising:
focusing incoming light from a scene with a wide field-of-view telescope including a plurality of at least four mirrors to provide an optical beam, one of the four mirrors being a movable mirror;

receiving the optical beam at a two-dimensional multi-waveband staring detector that includes a plurality of single-color focal plane array sensors spatially distributed over a common focal plane and co-aligned side-by-side relative to one another;

producing from the plurality of single-color focal plane array sensors a corresponding plurality of two-dimensional staring image signals, each single-color focal plane array sensor producing the corresponding two-dimensional staring image signal in a corresponding waveband;

combining the plurality of two-dimensional staring image signals to provide a multi-wavelength image of the scene;

analyzing the multi-wavelength image;

detecting an object of interest in the multi-wavelength image; and sequentially directing a field-of-view of each of the plurality of single-color focal plane array sensors one after another toward the object of interest by moving the movable mirror over a range of angular motion.

7. The imaging method of claim 6, further comprising cryogenically cooling the staring detector.

8. An imaging method comprising:
focusing incoming light from a scene with a wide field-of-view telescope including a plurality of at least four mirrors to provide an optical beam;

receiving the optical beam at a two-dimensional multi-waveband staring detector that includes a plurality of single-color focal plane array sensors spatially distributed over a common focal plane and co-aligned side-by-side relative to one another;

producing from the plurality of single-color focal plane array sensors a corresponding plurality of first two-dimensional staring image signals, each single-color focal plane array sensor producing the corresponding first two-dimensional staring image signal in a corresponding waveband;

sweeping the optical beam over the two-dimensional multi-waveband staring detector by tilting one of the at least four mirrors of the wide field-of-view telescope over a range of angular motion to obtain over time, sequentially from each of the plurality of single-color focal plane array sensors one after another, a plurality of second two-dimensional staring image signals corresponding to a common region of the scene; and combining the plurality of first two-dimensional staring image signals from the plurality of single-color focal plane array sensors to provide a first multi-wavelength image of the scene.

9. The imaging method of claim 8, further comprising combining the plurality of second two-dimensional staring image signals to produce a second multi-wavelength image of the common region of the scene.

10. The imaging method of claim 8, wherein sweeping the optical beam over the staring detector further includes sequentially obtaining over time from each single-color focal plane array sensor a plurality of two-dimensional staring single-color image signals of adjacent regions of the scene; and for each single-color focal plane array sensor, combining the plurality of two-dimensional staring single-color image signals to produce a corresponding two-dimensional single-color image of the scene.

11. The imaging method of claim 10, further comprising combining the two-dimensional staring single-color images of the scene from each single-color focal plane array sensor to produce a multi-color image of the scene.

* * * * *